US012379000B2

(12) United States Patent
Courville et al.

(10) Patent No.: US 12,379,000 B2
(45) Date of Patent: Aug. 5, 2025

(54) CONSTANT VELOCITY JOINT WITH STAKING FEATURES

(71) Applicant: Steering Solutions IP Holding Corporation, Saginaw, MI (US)

(72) Inventors: Jeffrey P. Courville, Frankenmuth, MI (US); Eduardo R. Mondragon-Parra, Freeland, MI (US); Jon N. Miller, Merrill, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 496 days.

(21) Appl. No.: 17/735,559

(22) Filed: May 3, 2022

(65) Prior Publication Data

US 2023/0358280 A1 Nov. 9, 2023

(51) Int. Cl.
*F16D 3/205* (2006.01)
*F16D 1/072* (2006.01)
*F16D 3/202* (2006.01)
*F16D 3/223* (2011.01)

(52) U.S. Cl.
CPC ........... *F16D 3/2055* (2013.01); *F16D 1/072* (2013.01); *F16D 2003/2026* (2013.01); *F16D 2003/22313* (2013.01); *Y10S 464/905* (2013.01); *Y10T 29/49936* (2015.01); *Y10T 29/49938* (2015.01); *Y10T 29/49945* (2015.01); *Y10T 403/4949* (2015.01)

(58) Field of Classification Search
CPC .................. F16D 3/2055; F16D 1/072; F16D 2003/2026; F16D 2003/22313; Y10S 464/905; Y10T 29/49936; Y10T 29/49938; Y10T 29/49945; Y10T 403/4949
USPC ......... 464/182; 29/521, 522.1, 525; 403/280
See application file for complete search history.

(56) References Cited

U.S. PATENT DOCUMENTS

| | | | | |
|---|---|---|---|---|
| 4,182,193 A | * | 1/1980 | Schultz, Jr. | ............. F16H 55/44 29/522.1 |
| 9,636,945 B2 | * | 5/2017 | Mochinaga | ............... F16D 1/06 |
| 2007/0107197 A1 | * | 5/2007 | Perrow | ................... F16D 1/072 29/525 |

* cited by examiner

*Primary Examiner* — Greg Binda
(74) *Attorney, Agent, or Firm* — Dickinson Wright PLLC

(57) ABSTRACT

A constant velocity joint includes an inner race having a main body defining a central opening. The constant velocity joint also includes a shaft member extending through the central opening, wherein the shaft member is staked to the inner race to axially retain the shaft member to the inner race.

5 Claims, 2 Drawing Sheets

CONSTANT VELOCITY JOINT WITH STAKING FEATURES

TECHNICAL FIELD

This disclosure relates to driveline systems and, more particularly, constant velocity joints with staking retention features for such driveline systems.

BACKGROUND

A vehicle, such as a car, truck, sport utility vehicle, crossover, mini-van, marine craft, aircraft, all-terrain vehicle, recreational vehicle, or other suitable vehicles, include driveline systems. Driveline systems may include a constant velocity joint that transmits power through the drive shaft at various angles. Additionally, constant velocity joints may be used in a driveline for a vehicle that transfers a rotational torque from one driveline component to another driveline component. The constant velocity joint facilitates angular displacement or angular movement of components that are interconnected by the constant velocity joint while still facilitating the transmission of torque.

Constant velocity joints are typically retained to a shaft, such as an axle bar, to retain the constant velocity joint inner race or spider. However, one or more separate, structural components are required to provide the retention. The additional component(s) increase cost and adds an interface for potential axial lash, which may undesirably increase noise and vibration.

SUMMARY

According to one aspect of the disclosure, a constant velocity joint includes an inner race having a main body defining a central opening. The constant velocity joint also includes a shaft member extending through the central opening, wherein the shaft member is staked to the inner race to axially retain the shaft member to the inner race.

According to another aspect of the disclosure, a constant velocity joint includes an inner race having a main body defining a central opening. The constant velocity joint also includes a shaft member extending through the central opening, wherein the shaft member is press fit to the inner race within the central opening to axially retain the shaft member to the inner race.

According to yet another aspect of the disclosure, a method of assembling a constant velocity joint is provided. The method includes extending a shaft member through a central opening of an inner race. The method also includes axially retaining the shaft member to the inner race without a retaining ring.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, commonly include a driveline system including a constant velocity joint. The constant velocity joint is configured such that it may be used in a driveline for transferring a rotational torque from one driveline component to another driveline component. The constant velocity joint facilitates angular displacement or angular movement of components that are interconnected by the constant velocity joint while still facilitating the transmission of torque.

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
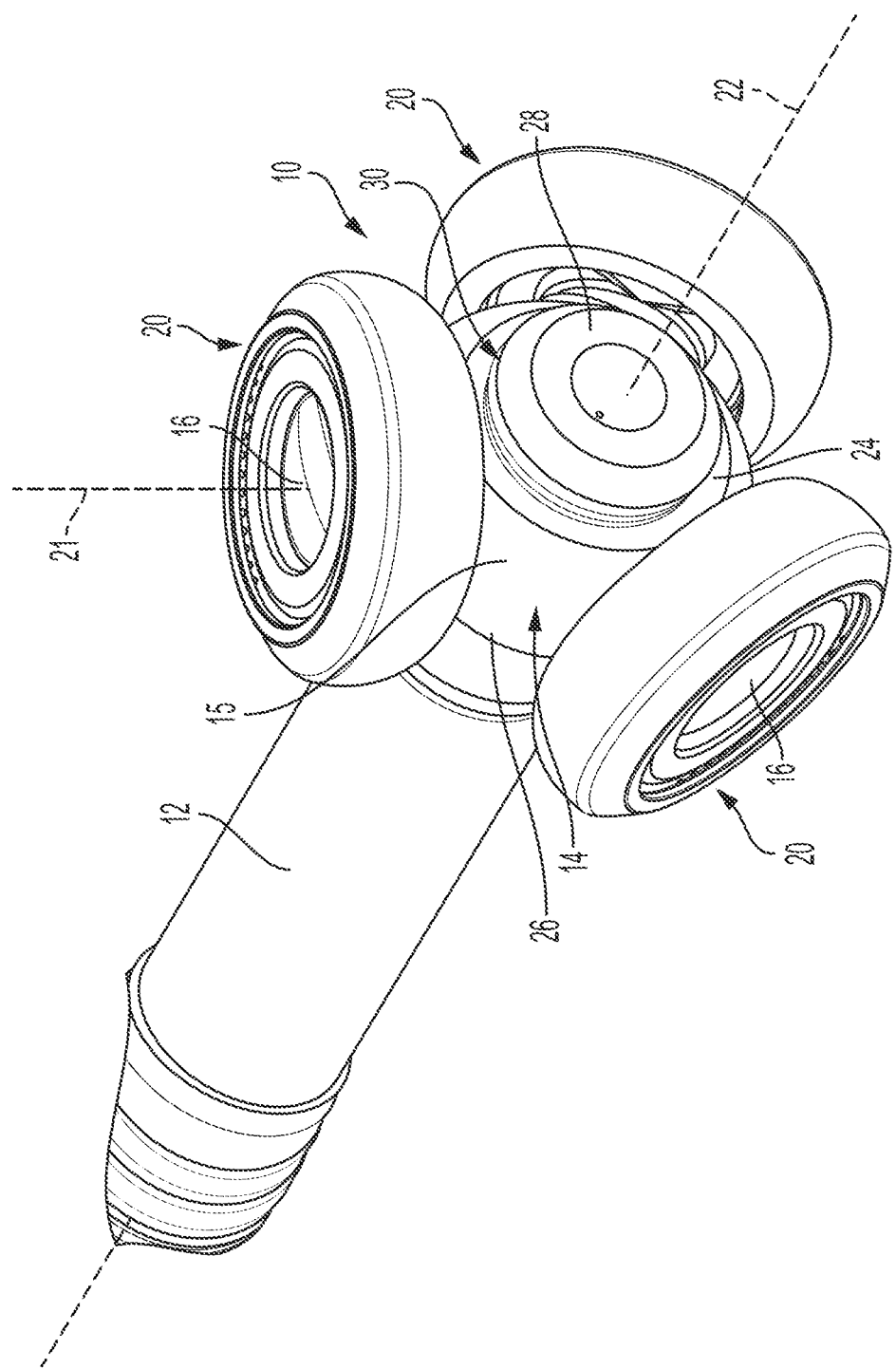
FIG. 1 is a perspective view of a portion of a constant velocity joint.

Referring to FIG. 1, a constant velocity joint 10 is shown. The constant velocity joint may be any type of joint that receives a shaft member 12 to facilitate a constant connection with the shaft member 12 and another component, even during relative angular changes between the shaft member 12 and the connected component. In the illustrated example, the constant velocity joint 10 is a tripot constant velocity joint, or simply a tripot joint, but it is to be appreciated that other types of constant velocity joints are contemplated. The constant velocity joint 10 is provided with a vehicle such as a truck, automobile, recreational vehicle, cargo vehicle, or the like. Such a constant velocity joint 10 may be suitable for use in front wheel drive vehicles and is disposed between and operatively coupled to a transaxle and a driving wheel or other applications where torque is transferred between components with possible axial position or angular position changes relative to each other. The constant velocity joint allows the shaft member 12 to transmit torque to one or more other components, while undergoing angular maneuvers.

The constant velocity joint 10 of the illustrated tripot type includes a housing (not shown) and an inner race 14. The inner race 14 includes a main body 15 and a plurality of spider segments 16 which extend radially outwardly from the inner race 14. The inner race 14 and the shaft member 12 are secured to each other. In such an embodiment, each spider segments 16 is configured as a trunnion 20. The trunnion 20 extends along a trunnion axis 21 away from a longitudinal axis 22 of the shaft member 12. The trunnion axis 21 is disposed substantially perpendicular to the longitudinal axis 22 of the shaft member 12. The trunnion 20 has a functional outer surface that transmits torque or force that is adjacent to a non-functional outer surface of the trunnion 20 that does not transmit torque or force. In the illustrated embodiments, three plurality of spider segments 16 includes three spider segments spaced evenly around the circumference of the main body 15 of the inner race 14.

The shaft member 12 may be any type of shaft. In some embodiments, the shaft member 12 is an axle bar (e.g., "half shaft") that is part of driveline system which transfers rotation to a vehicle wheel. However, other types of shafts may benefit from the embodiments of the constant velocity joint 10 disclosed herein.

Regardless of the particular type of constant velocity joint employed, the shaft member 12 is fixed to the inner race 14 of the constant velocity joint 10. The inner race 14 extends axially along the longitudinal axis 22 of the shaft member 12 from a first face 24 to a second face 26. An end 28 of the shaft member 12 extends axially through a central opening 30 defined by the inner race 14. The end 28 of the shaft member 12 protrudes through the central opening 30 and is in close proximity to one of the first face 24 and the second face 26.

Figure 3:
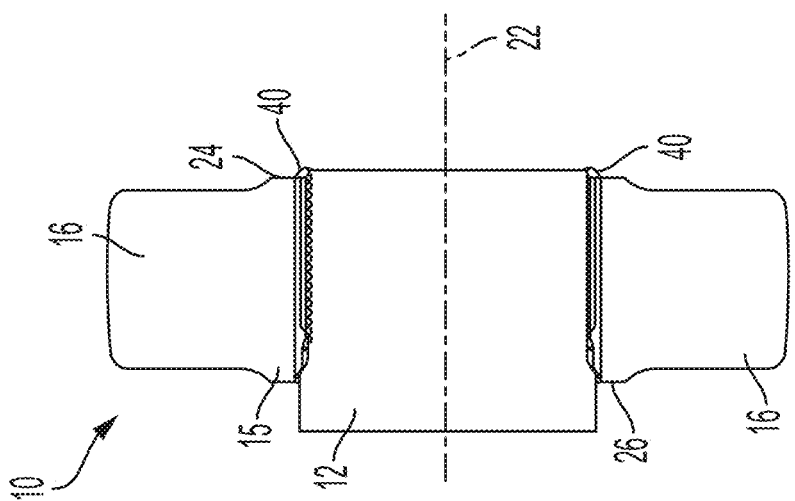
FIG. 3 is a cross-sectional view of the inner race and the shaft member in a direction perpendicular to the cross-sectional view of FIG. 2.
Figure 2:
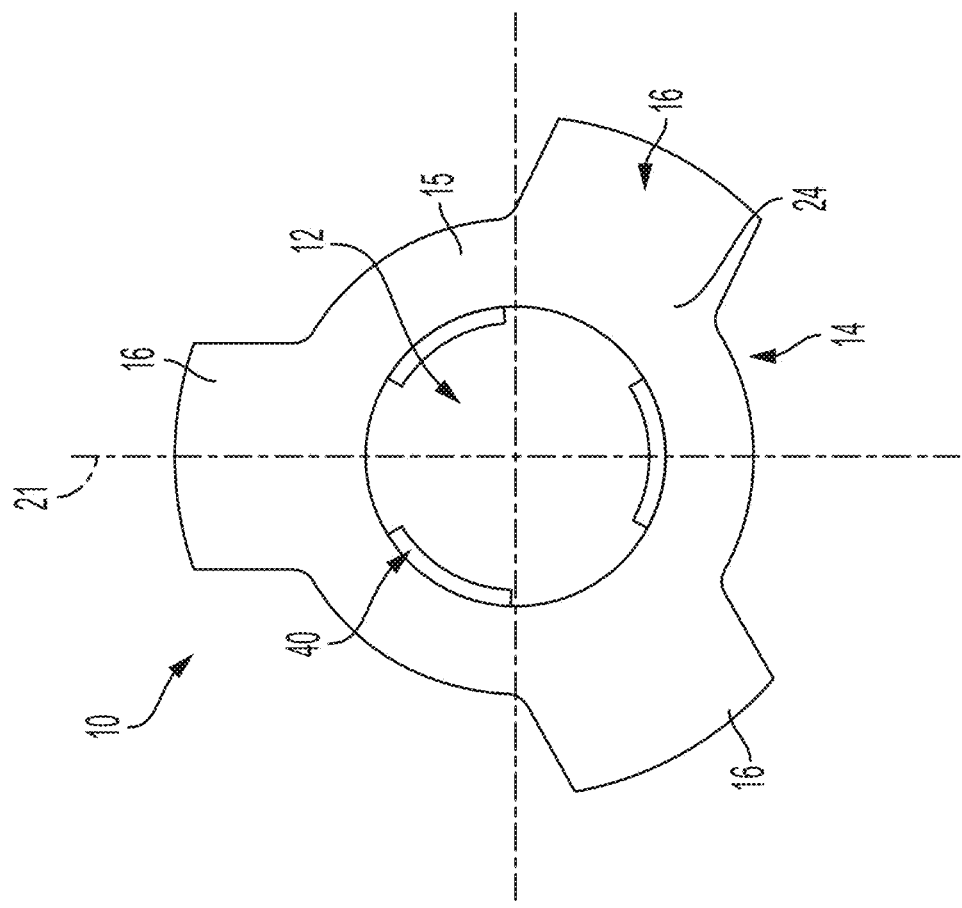
FIG. 2 is an axial cross-sectional view of an inner race and a shaft member of the constant velocity joint.

Referring now to FIGS. 2 and 3, to secure the shaft member 12 to the inner race 14, the shaft member 12 is staked to the inner race 14 in some embodiments. In particular, a portion of parent material of the shaft member 12 proximate the end 28 of the shaft member 12 is plastically deformed in a way that pushes material against the inner race 14. The plastically deformed material forms a stake structure 40 which axially retains the shaft member 12 and the inner race 14 relative to each other. Staking the shaft member 12 to the inner race 14 results in the work hardened material being pressed against the inner race 14, thus retaining the constant velocity joint.

In addition to axially retaining the shaft member and the inner race 14 to each other, the stake structure 40 eliminates axial lash that is inherently present in constant velocity joint designs that rely on a ring retainer disposed in a machined ring groove on the shaft member, snap-fit designs, or the like.

In some embodiments, the stake structure is a single stake that extends 360 degrees around the central opening 30 to provide a continuous stake feature that retains the shaft member 12 and the inner race 14 to each other. In other embodiments, the stake structure 40 is segmented, as shown in FIG. 2. In particular, the segmented stake structure includes a plurality of stake members circumferentially spaced from each other around the central opening 30 to provide a discontinuous stake assembly that retains the shaft member 12 and the inner race 14 to each other. The circumferential spacing of the stake members may be evenly or unevenly distributed and the number of stake members may vary depending upon the particular requirements of the structure.

The stake structure 40 disclosed herein does not require a groove on the shaft member 12 and/or a soft, internal spline to deform the material. The embodiments disclosed herein can use hardened internal splines on the walls(s) of the inner race 14 defining the central opening 30 and external splines of the shaft member 12.

In some embodiments, the shaft member 12 is secured to the inner race 14 by press fitting the shaft member 12 to the wall(s) defining the central opening when inserting the shaft member 12 within the central opening 30. Press fitting the shaft member 12 to the inner race 14 axially retains the shaft member and the inner race 14 to each other and eliminates axial lash with the interference fit condition of the two components.

The embodiments disclosed herein rely on a stake structure 40 or an interference fit between the shaft member 12 and the inner race 14 to eliminate axial lash, thus leading to better vehicle noise and vibration performance. Additionally, the disclosed embodiments reduce cost by eliminating additional retention components.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A constant velocity joint comprising:
an inner race having a main body defining a central opening; and
a shaft member extending through the central opening, wherein the shaft member is staked to the inner race to axially retain the shaft member to the inner race without a mechanical fastener, wherein the shaft member does not include a groove on the shaft member, wherein the inner race extends axially from a first face to a second face, the central opening extending from the first face to the second face, wherein the shaft member is staked to one of the first face and the second face, wherein the shaft member includes a stake structure comprising a plurality of stake members circumferentially spaced from each other around the central opening.

2. The constant velocity joint of claim 1, wherein the shaft member is an axle bar of a driveline system.

3. The constant velocity joint of claim 1, wherein the inner race includes a plurality of spider segments extending radially outwardly from the main body and circumferentially spaced from each other.

4. The constant velocity joint of claim 3, wherein the plurality of spider segments includes three spider segments spaced evenly around the circumference of the main body.

5. A method of assembling a constant velocity joint comprising:
- extending a shaft member through a central opening of an inner race; and
- axially retaining the shaft member to the inner race without a retaining ring or other mechanical fastener, wherein the shaft member does not include a groove on the shaft member, wherein axially retaining the shaft member to the inner race comprises staking the shaft member to the inner race by plastically deforming material of the shaft member to bias material of the shaft member against the inner race, wherein staking the shaft member to the inner race comprises forming a plurality of stake members circumferentially spaced from each other around the central opening.

* * * * *